United States Patent
Zimmer

(10) Patent No.: US 8,909,421 B2
(45) Date of Patent: Dec. 9, 2014

(54) WINDSHIELD WIPING DEVICE

(75) Inventor: Joachim Zimmer, Changsha (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/520,201

(22) PCT Filed: Nov. 4, 2010

(86) PCT No.: PCT/EP2010/066807
§ 371 (c)(1),
(2), (4) Date: Oct. 1, 2012

(87) PCT Pub. No.: WO2011/079990
PCT Pub. Date: Jul. 7, 2011

(65) Prior Publication Data
US 2013/0018546 A1  Jan. 17, 2013

(30) Foreign Application Priority Data
Dec. 30, 2009  (DE) .......................... 10 2009 055 399

(51) Int. Cl.
G06F 7/00      (2006.01)
B60R 22/00     (2006.01)
E05F 15/00     (2006.01)
G05D 1/00      (2006.01)
G05D 3/00      (2006.01)
G06F 17/00     (2006.01)
B60S 1/08      (2006.01)

(52) U.S. Cl.
CPC .............. B60S 1/0896 (2013.01); B60S 1/0844 (2013.01); B60S 1/0866 (2013.01)
USPC .............................................. 701/36; 701/49

(58) Field of Classification Search
CPC ............ B60S 1/04; B60S 1/06; B60S 1/0896
USPC .......................................................... 701/36
See application file for complete search history.

(56) References Cited

U.S. PATENT DOCUMENTS 3,593,090 A  *  7/1971  Kearns ..................... 318/444
4,544,870 A  * 10/1985  Kearns et al. ............ 318/444
5,923,027 A     7/1999  Stam et al.
(Continued)

FOREIGN PATENT DOCUMENTS

DE    102008001816        11/2009
WO    WO 2009138345 A1  * 11/2009

OTHER PUBLICATIONS

PCT/EP2010/066807 International Search Report dated Dec. 20, 2010 (Translation and Original, 4 pages).

*Primary Examiner* — Calvin Cheung
*Assistant Examiner* — Lail Kleinman
(74) *Attorney, Agent, or Firm* — Michael Best & Friedrich LLP

(57) ABSTRACT

The invention relates to a windshield wiping device (1), in particular for a motor vehicle, comprising at least one driving device (2) which can be controlled by a control device (3), said control device (3) controlling a power and torque requirement of the windshield wiping device (1) dependent on at least one or more parameters influencing the power and torque requirement of the driving device (2). The invention is characterized in that the control device (3) has at least parameters for determining the current position of the motor vehicle to reduce the power and torque.

16 Claims, 3 Drawing Sheets

(56) References Cited

U.S. PATENT DOCUMENTS

| | | | |
|---|---|---|---|
| 6,472,977 B1* | 10/2002 | Pochmuller | 340/425.5 |
| 6,691,366 B1* | 2/2004 | Zimmer | 15/250.27 |
| 7,019,275 B2 | 3/2006 | Stam et al. | |
| 7,095,199 B2* | 8/2006 | Hirose et al. | 318/444 |
| 7,166,979 B2 | 1/2007 | Zimmer | |
| 8,315,775 B2* | 11/2012 | Biondo et al. | 701/93 |
| 2002/0032510 A1* | 3/2002 | Turnbull et al. | 701/49 |
| 2004/0010879 A1* | 1/2004 | Zimmer | 15/250.3 |
| 2004/0025282 A1* | 2/2004 | Zimmer et al. | 15/250.351 |
| 2004/0144911 A1* | 7/2004 | Stam et al. | 250/208.1 |
| 2004/0153225 A1* | 8/2004 | Stam et al. | 701/36 |
| 2006/0006826 A1* | 1/2006 | Morishita | 318/483 |
| 2006/0055354 A1* | 3/2006 | Hirose et al. | 318/444 |
| 2007/0085504 A1 | 4/2007 | Kokuryo et al. | |
| 2010/0204896 A1* | 8/2010 | Biondo et al. | 701/93 |

* cited by examiner

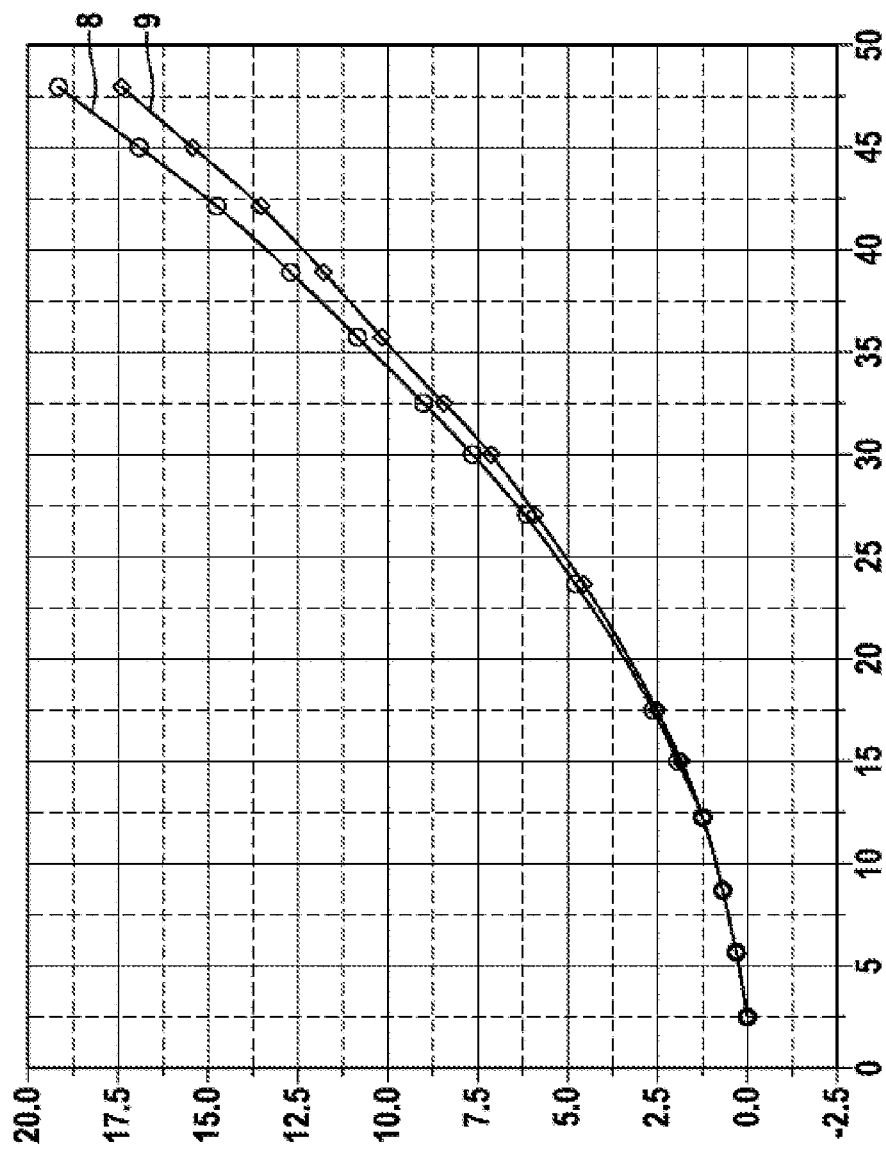

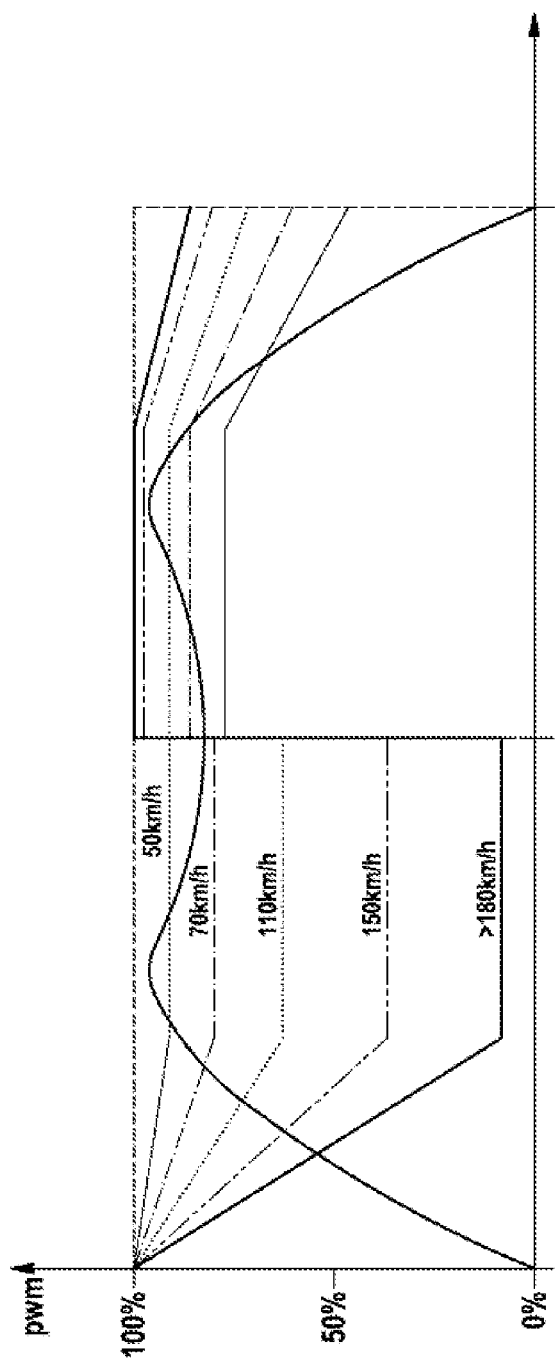

WINDSHIELD WIPING DEVICE

BACKGROUND OF THE INVENTION

The present invention relates to a windshield wiping device, in particular for a motor vehicle, with at least one drive device, which can be controlled via a control device, the control device controlling a power and torque requirement of the windshield wiping device depending on at least one or a plurality of parameters influencing the power and torque requirements of the drive device.

The physical size of a wiper motor is fixed nowadays taking into consideration a "worst case scenario". For this purpose, all of the extreme situations to which a windshield wiping device could be subjected, such as windshield drying off, highest wiper arm resting force on the windshield and highest travel speed, for example, are assumed in order to guarantee the power and torque requirements even in the event that the most unfavorable environmental conditions coincide. The consequence of this is extremely high-torque motors, with the dimensions of the mechanical components of the wiper system with respect to strength needing to be matched to the pull-in torque of said motors.

Owing to the resultant large dimensioning of a wiper motor of the windshield wiping device and also the external dimensions, the applicant was confronted with the problem of performing precise adaptation of the motor torque taking into consideration environmental conditions or the signals present in the vehicle, from which the power and torque requirement of the wiper system which is required at any point in time can be derived. Such an adaptation of the motor torque taking into consideration some environmental conditions is proposed in document DE 10 2008 001 816 A1, for example. This document provides a windshield wiping device which has one or more drive devices which can be controlled via a control device. The control device is in this case designed in such a way that it controls the power requirement of the windshield wiping device depending on at least one or a plurality of parameters which have an influence on the power requirement of the respective drive device of the windshield wiping device. In this case, the parameters include at least the travel speed and/or the windshield state.

The prior art, in accordance with document DE 101 44 985, has also disclosed a method for controlling a windshield wiping device, in which method the control device determines the torque of the drive device which can be output depending on the transmission ratio of the windshield wiper rod assembly or the rotary angle thereof in order to control a drive device of the windshield wiping device. The rotary angle range of a motor crank of the windshield wiping device is in this case divided into a plurality of angle ranges, with a dedicated maximum torque being assigned to each of said angle ranges. The control device first calls up the corresponding parameters of various devices of the motor vehicle, such as the rain sensor, the speedometer or the like, for example, in order to determine the required torque and assigns corresponding index to said parameters in order to respond correspondingly to environmental conditions. A predictive adjustment of the required torque of the wiper system is not possible under these conditions, however, which can mean that the windshield wiping device responds relatively slowly to changing functional parameters, in particular of the environmental conditions.

SUMMARY OF THE INVENTION

The object of the present invention is therefore to provide a windshield wiping device which permits a more flexible response to environmental parameters.

This object is achieved according to the invention in that the control device comprises, in order to reduce the power and torque, at least parameters for determining the present position of the motor vehicle. A position of the motor vehicle can take place, for example, with the aid of satellite signals, for example a GPS. By establishing the present position, it is possible to call up information regarding the prevailing weather conditions, such as, for example, precipitation or the present temperature.

An advantageous embodiment of the present invention envisages calling up the corresponding parameters of the vehicle position with a navigation system provided in the motor vehicle in order to determine the present position of the motor vehicle or else, even quasi predictively, a future position of the motor vehicle, for example in order to determine the environmental conditions prevailing there. For this purpose, the control device can be coupled to the navigation system and initiate, in good time, and modify at short notice, control of families of characteristics taking into consideration future environmental conditions as well.

One embodiment of the present invention envisages that, in a family of characteristics formed by the parameters to be included, the maximum permissible travel speed is taken into consideration. In many countries, a country-specific maximum speed is stipulated on motorways and country roads. By virtue of the assignment of the country-specific maximum speed, it is also possible here to provide a point of reference for the maximum required torque of the drive device of the windshield wiping device.

In order to provide a further possibility which permits control of families of characteristics incorporating the vehicle speed, the control device can be coupled to a cruise control system provided in the motor vehicle. If a driver of the motor vehicle has input a corresponding speed into the cruise control system, a conclusion can also be drawn on the power and torque requirement of the windshield wiping device on the basis of this speed and control of families of characteristics can be initiated in good time taking into consideration future speed parameters.

A further possibility of being able to take into consideration the vehicle speed predictively in the control of families of characteristics is provided by virtue of the fact that the control device is coupled to a camera system provided on the vehicle. The camera system can determine presently local speed limits depending on the vehicle position in order to use these speed limits to communicate the parameters relating to travel speed. It is naturally also possible to call up this information from a navigation system of the vehicle if this navigation system can provide information relating to speed limits.

In order to establish the level of resistance to the wiper blades on a front windshield of the vehicle, which at the same time is associated with an increase in the power and torque requirement of the drive device, in one exemplary embodiment of the present invention the windshield state of the vehicle can be taken into consideration in the control of families of characteristics for determining the rotational speed of the drive device of the windshield wiping device by means of at least one rain sensor.

In a preferred embodiment of the invention, the wiper arm angle, the wiping movement direction, i.e. an upward or downward wiping movement of the wiper arms on the front windshield, a transmission ratio of a wiper arm rod assembly of the windshield wiping device and/or a wiper speed can be determined as parameters which have an influence on the power requirement of the respective drive device of the windshield wiping device. As a result, the power allocation to the drive device can be honed or differentiated further.

The transmission ratio can additionally be taken into consideration in the case of wiper motors with a wiper arm rod assembly, while there is no need for this to be taken into consideration in the case of wiper motors with a wiper motor direct drive (WDD).

The combination of the determination of the travel speed and the windshield state even a few seconds in advance makes it possible for the power of the respective drive device to be determined and adjusted flexibly and predictively depending on a predetermined travel speed and a wiping movement, i.e. an upward wiper movement and/or downward wiper movement. For this purpose, one or more families of characteristics can be stored, for example, in a storage device of the control device and can be called up via the control device. In this case, the control device can be part of the motor controller or part of the windshield wiping device, for example can be coupled to the motor controller.

A method according to the invention for electronically controlled limitation of a power and torque of a windshield wiping device, in particular for a motor vehicle, which can be controlled via a control device which controls a power and torque requirement of the windshield wiping device depending on one or more parameters having an influence on the power requirement of the drive device comprises the following steps.

determining one or more parameters, wherein the parameters include at least the present position of the vehicle and/or the maximum permissible travel speed and/or travel speed which can be set via a cruise control system; and controlling the power and torque requirement of the windshield wiping device depending on the respective parameters.

In an exemplary embodiment of the method according to the invention, in order to control families of characteristics, a wiper arm angle, a wiping movement direction, a transmission ratio of a wiper arm rod assembly of the windshield wiping device, a wiper speed, a transmission ratio of a drive rod assembly, an external temperature and/or a windshield state are also taken into consideration as parameters.

As regards further advantageous embodiments of the present invention, reference is made to the dependent claims and the drawing explained in more detail below.

BRIEF DESCRIPTION OF THE DRAWINGS

In the drawing:

FIG. 2 shows a graph in which the profile of the force of resistance is shown as a function of the vehicle speed; and FIG. 3 shows a graph in which a further example of a power reduction of the drive device as a function of the vehicle speed is shown.

DETAILED DESCRIPTION

Figure 1:
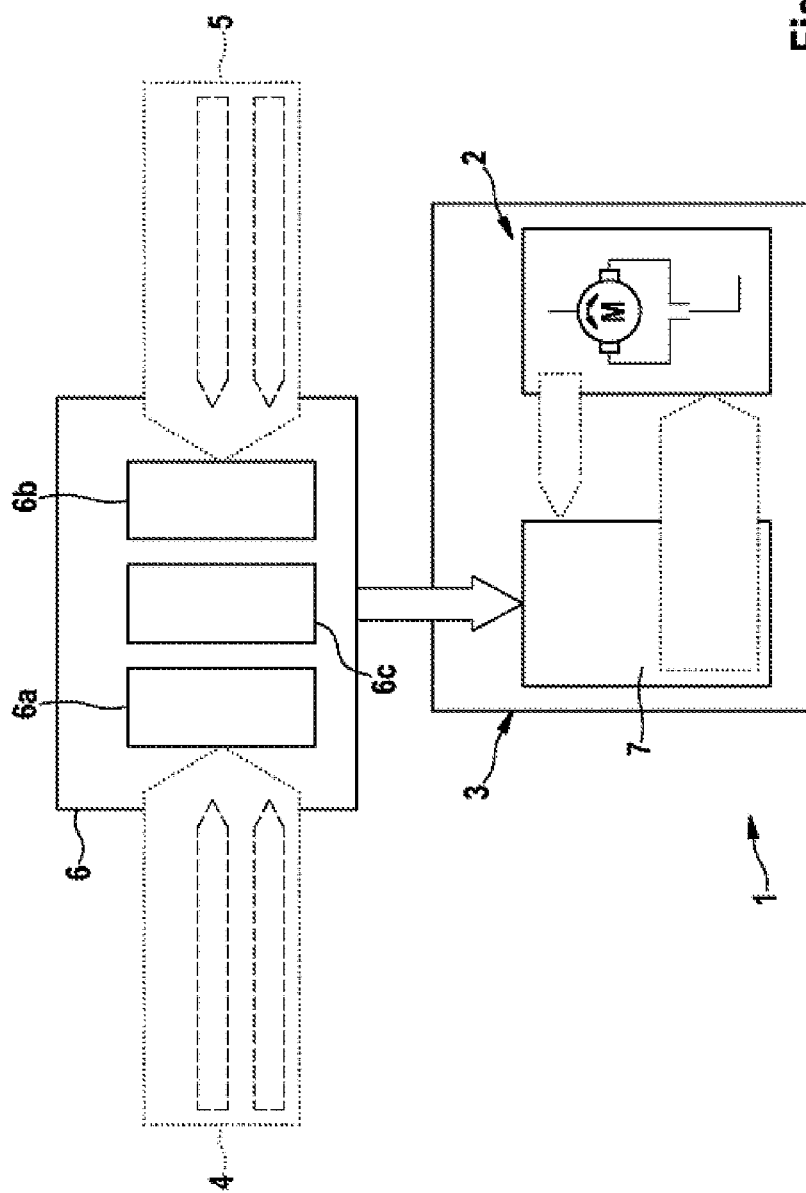
FIG. 1 shows a schematic illustration of a chart for controlling a drive device of a windshield wiping device in accordance with the invention.

FIG. 1 shows a schematic illustration of a flow chart for the signal processing of position and speed limit information and subsequent calculation and matching of the power or motor torque thereof in a windshield wiping device 1 according to the invention.

The windshield wiping device 1 according to the invention for a motor vehicle has, for this purpose, a drive device 2, which can be controlled via a control device 3, the control device 3 controlling a power and torque requirement of the windshield wiping device 1 depending on a plurality of parameters influencing the power and torque requirement of the drive device 2. Two of the parameters are in this case characterized by the location determination 4 and the speed limit 5 and therefore take into consideration the present position of the motor vehicle and locally prescribed speed limits. In the exemplary embodiment shown, signals regarding position 6a and speed 6b can be obtained from a vehicle electrical system 6. Other signals can include environment-related signals such as temperature, air humidity, rain or probability of snow prevailing in the environment or the like.

The flow of information when using the signals with respect to location determination 4 and speed limit 5 is passed on from a vehicle electrical system 6 to the control unit 3 or control electronics 7 integrated in the drive device 2 of the windshield wiping device 1 and processed therein in order to calculate the associated power requirement.

The chart shown in FIG. 1 shows the control of the drive device 2 of the windshield wiping device 1 in accordance with a first embodiment of the invention. In this regard, first the parameters of environmental conditions and the maximum permissible travel speed are determined depending on the position of the vehicle. At the same time, the position data determined in this case via a GPS signal by means of a navigation device are coupled with weather forecast data, with the result that the environmental conditions to be expected, for example on the basis of weather forecasts, rain, snow and temperatures, can be called up very precisely in advance even before the vehicle has reached the position and recourse can be made to the control of the families of characteristics correspondingly.

The local speed limits are first determined by means of a camera system fitted on the vehicle body, and this camera system is capable of detecting speed limit signs located along the side of the road and therefore of determining the prevailing maximum speed. For this purpose, the control device 4 is coupled to the camera system.

A further possibility of early speed detection is provided by the control device being coupled to a cruise control system installed in the motor vehicle, said cruise control system making it possible to estimate the maximum speed to be expected, as set by the user, until the user of the vehicle switches off the cruise control or increases or reduces the maximum speed set.

The signals retrieved from the construction system 6 are then passed on to the control device 2. The control electronics 7 are arranged in the control device 3 and receive information from the drive device 2 with respect to the loads acting on the windshield wiping device 1, in particular the power or torque set at that time. This value for the torque is compared with a value determined from the control of indices and, in the event of a discrepancy between the two values, the torque is adapted, i.e. the torque is increased or decreased corresponding to the result of the control of indices.

FIG. 2 shows a profile of a wind resistance force as a function of the travel speed of from 0 km/h to 180 km/h. The figure shows two profiles, one for the driver's side 8 and one for the passenger's side 9. The graph shows that, as the incident flow speed at which a vehicle experiences incident flow increases, the wind resistance force increases considerably. Therefore, the faster a vehicle is travelling, the higher the incident flow speed and the wind resistance force which acts on the wiper system and needs to be counteracted by the windshield wiping device 1, for example during downward wiping.

The difference in the power requirement of the windshield wiping device 1 during an upward or downward movement of a wiper arm of the windshield wiping device 1 for a wiper direct drive WDD is shown in FIG. 3. Said figure shows a graph with characteristics for a power and torque reduction of the drive device as a function of the vehicle speed for an upward and downward movement of the wiper device. In addition, the graph shows a curve for the drag force. This means that, at a wiper arm angle of 0-45°, the drag force increases gradually and, during an upward wiper movement, additionally assists the wiper arm. Correspondingly, the power requirement during upward wiping, as shown in FIG. 3, is also reduced, for example in a range of 0-45°, initially slowly from 100% to a determined maximum value. For a range above 30°, for example, on the other hand, the power requirement is reduced to a predetermined final value, in accordance with FIG. 3.

The invention claimed is:

1. A windshield wiping device for a motor vehicle, the windshield wiping device comprising:
a controller configured to
determine a first power and torque setting based on a first set of ambient conditions, the first set of ambient conditions including a current position of the motor vehicle,
wherein the ambient conditions influence a power and torque necessary to move the windshield wiper across the windshield of the motor vehicle at a target non-zero speed,
determine a second power and torque setting based on a second set of the ambient conditions, the second set of the ambient conditions including an updated position of the motor vehicle,
wherein the second power and torque setting is different than the first power and torque setting, and
wherein the second power and torque setting is determined based on a power and torque necessary to move the windshield wiper across the windshield of the motor vehicle at the same target non-zero speed under the second set of the ambient conditions as the first power and torque setting under the first set of the ambient conditions;
at least one drive device, the drive device configured to move the windshield wiper across the windshield of the motor vehicle at the target non-zero speed based upon
the first power and torque setting after determining the first power and torque setting and before determining the second power and torque setting, and
the second power and torque setting after determining the second power and torque setting.

2. The windshield wiping device as claimed in claim 1, wherein determination of the current position and the updated position of the motor vehicle is performed using satellite signals.

3. The windshield wiping device as claimed in claim 1, wherein the controller is coupled to a GPS provided in the motor vehicle in order to determine the current position and the updated position of the motor vehicle.

4. The windshield wiping device as claimed in claim 1, wherein the first set and second set of ambient conditions further includes a maximum permissible travel speed.

5. The windshield wiping device as claimed in claim 4, wherein the controller is coupled to a cruise control system provided in the motor vehicle in order to determine the maximum permissible travel speed.

6. The windshield wiping device as claimed in claim 4, wherein the controller is coupled to a camera system provided on the motor vehicle, said camera system determining local speed limits depending on the current position and the updated position of the motor vehicle, wherein the local speed limit is used to determine the maximum permissible travel speed.

7. The windshield wiping device as claimed in claim 1, further comprising at least one rain sensor for determining at least one selected from a group including environmental conditions and a windshield state of the motor vehicle.

8. The windshield wiping device as claimed in claim 1, wherein the first set and second set of ambient conditions further includes at least one selected from a group including wiper arm angles, a transmission ratio of a wiper arm rod assembly of the windshield wiping device, and a wiper speed.

9. The windshield wiping device as claimed in claim 1, wherein the controller includes a control unit.

10. The windshield wiping device as claimed in claim 1, wherein the controller includes control electronics.

11. The windshield wiping device as claimed in claim 1, wherein the first set and second set of ambient conditions further includes a direction of the desired movement of the windshield wiper across the windshield of the motor vehicle.

12. A method for controlling movement of a windshield wiper across a windshield of a motor vehicle, the method comprising:
determining, by a controller, a first power and torque setting based on a first set of ambient conditions, the first set of ambient conditions including a current position of the motor vehicle,
wherein the ambient conditions influence a power and torque necessary to move the windshield wiper across the windshield of the motor vehicle at a target non-zero speed;
operating a drive device based upon the first power and torque setting to move the windshield wiper across the windshield of the motor vehicle at the target non-zero speed;
determining, by the controller, a second power and torque setting based on a second set of the ambient conditions, the second set of the ambient conditions including an updated position of the motor vehicle,
wherein the second power and torque setting is different than the first power and torque setting, and
wherein the second power and torque setting is determined based on a power and torque necessary to move the windshield wiper across the windshield of the motor vehicle at the same target non-zero speed under the second set of the ambient conditions as the first power and torque setting under the first set of the ambient conditions; and
operating the driver device based upon the second power and torque setting to move the windshield wiper across the windshield of the motor vehicle at the target non-zero speed.

13. The method as claimed in claim 12, wherein first set and second set of ambient conditions further includes at least one selected from a group including a wiper arm angle, a transmission ratio of a wiper arm rod assembly of the windshield wiping device, a wiper speed, a transmission ratio of a drive rod assembly, an external temperature, and a windshield state.

14. The method as claimed in claim 12, wherein the first set and second set of ambient conditions further includes a maximum permissible travel speed.

15. The method as claimed in claim 14, wherein the maximum permissible travel speed of the motor vehicle is determined by a setting of a cruise control system.

16. The method as claimed in claim 12, wherein the first set and second set of ambient conditions includes a direction of movement of the windshield wiper across the windshield of the motor vehicle.

\* \* \* \* \*